(12) United States Patent
Pettingill

(10) Patent No.: US 7,780,289 B2
(45) Date of Patent: Aug. 24, 2010

(54) DUAL EYEWEAR STRAP

(75) Inventor: Bernard Frances Pettingill, Palm Beach Gardens, FL (US)

(73) Assignee: Bernard F. Pettingill, Jr., Palm Beach Gdns., FL (US)

( * ) Notice: Subject to any disclaimer, the term of this patent is extended or adjusted under 35 U.S.C. 154(b) by 0 days.

(21) Appl. No.: 11/681,684

(22) Filed: Mar. 2, 2007

(65) Prior Publication Data

US 2008/0316422 A1 Dec. 25, 2008

(51) Int. Cl.
*G02C 3/00* (2006.01)

(52) U.S. Cl. .................. 351/156; 351/157; 351/158

(58) Field of Classification Search .................. 351/41, 351/156–158
See application file for complete search history.

(56) References Cited

U.S. PATENT DOCUMENTS

| 5,004,334 A * | 4/1991 | Miele ........................ 351/54 |
| 6,520,635 B1 * | 2/2003 | Ignatowski .................. 351/52 |
| 6,899,423 B1 * | 5/2005 | Brazell ....................... 351/157 |

* cited by examiner

*Primary Examiner*—Huy K Mai

(57) ABSTRACT

Eye glass strap holder for securing two separate pair of glasses, such as, but not limited to, sunglasses and reading glasses, to neck with a double to single strap design and an adjustment block to aid in fastening around one's neck for easy exchanging from one set of glasses, sunglasses or reading glasses to the other.

3 Claims, 4 Drawing Sheets

US 7,780,289 B2

DUAL EYEWEAR STRAP

CROSS-REFERENCE TO RELATED APPLICATIONS

Brazell (U.S. Pat. No. 6,899,423); Ignatowski (U.S. Pat. No. 6,520,635); Miele (U.S. Pat. No. 5,004,334)

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a single to double strap eyewear holder; with the advantage of having two separate end straps to hold two pair of glasses with only one strap around ones neck vs. two completely separate straps around ones neck. The elimination of a second separate strap to hold a second pair of eyewear makes this invention more user friendly to individuals as it eliminates the need to adjust two separate straps for proper neck positioning of eyewear. In particular, this invention would have a useful application for officers, rescue workers, and other individuals who routinely shift in and out of environments where they need to exchange eyewear quickly.

(2) Description of Related Art Including Information Disclosed Under 37 CFR 1.97 and 1.98

Not Applicable

Safety and security, knowing that two selected pair of eyeglasses are readily available for use enhances one's security. For example, a construction worker, who frequently works in an open environment, can easily switch from sunglasses to safety glasses or even to reading glasses for blueprints.

Millions of people have multiple glasses, which they need to use almost simultaneously. However, many of them remove this eyewear during the course of a day for various reasons, such as, but not limited to, when they come inside from the sun, when they enter a tunnel or simply during a walk into a dark area. In some cases, individuals remove their eyewear to perform other activities and need to change from safety or sunglasses to reading glasses to examine small print. In this case, the user requires a place to hold or store the second pair of eyewear when they are not used or they may risk damaging them or even worse losing them.

Some types of eyewear can be very bulky and difficult to store, sunglass cases are commonly available, as are single straps, which hold a single pair of eyewear. However, two sets of eyeglass cases can be impractical as well as multiple neck straps, therefore by utilizing our invention, one can eliminate these added straps and multiple case confusion.

The present invention addresses these and other deficiencies associated with the problems of maintaining two straps for eyeglasses and keeping them available for quick exchange in the case of transitioning from inside an office building to outside exposure to direct light or perhaps between various types of glasses, such as, but not limited to, reading glasses.

BRIEF SUMMARY OF THE INVENTION

Eyewear is utilized throughout today's busy world with quick access needed to facilitate various life situations, which the present embodiment of the invention provides. The preferable embodiment of the invention contains an adjustment slider on the single strap around ones neck made of plastic, wood or other material, which then splits into double strap ends with connectors to accommodate two separate sets of eyewear.

The strap is fabricated from resilient material, such as, but not limited to, alloy, composite, laminate or some combination. In the preferred embodiment, the adjustment block has a diameter of approximately 0.5 inch, the single strap has a length of approximately 12 inches, splits into double strap ends with each end approximately 8 inches long and with each end connector approximately 1 inch in length to hold eyewear.

BRIEF DESCRIPTION OF THE SEVERAL VIEWS OF THE DRAWING(S)

DETAILED DESCRIPTION OF THE INVENTION

Figure 1:
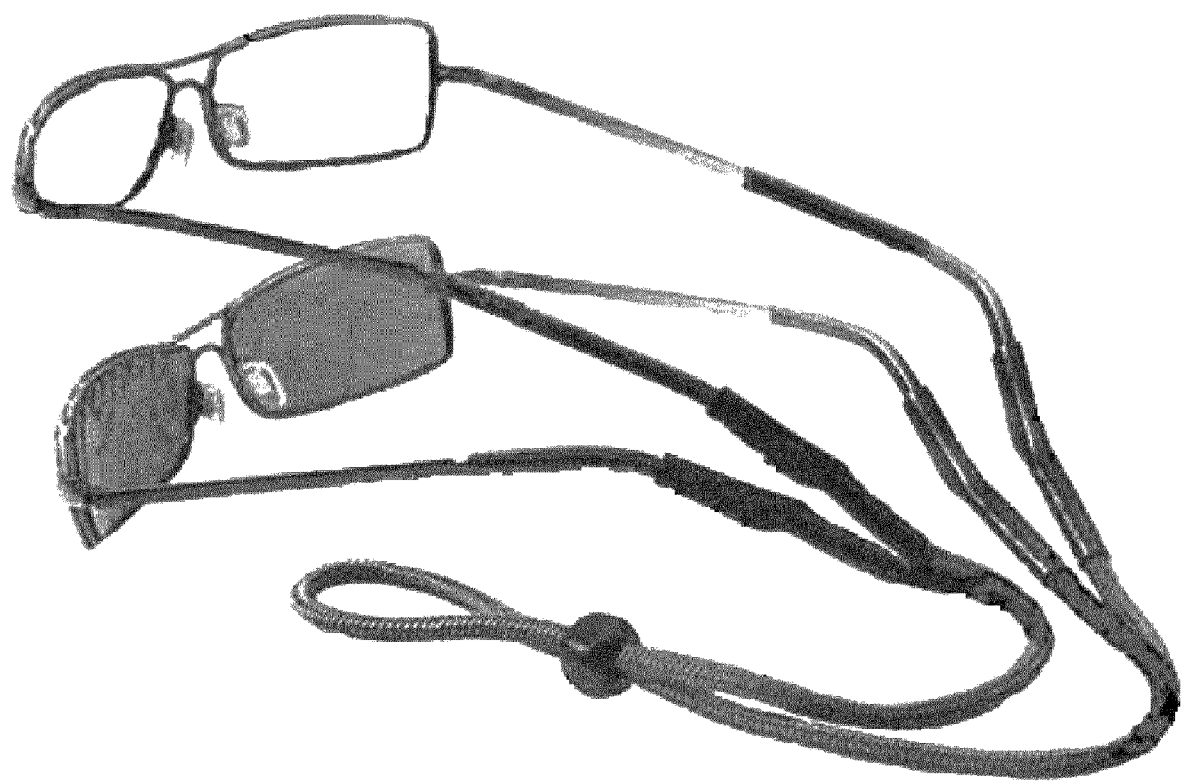
FIG. 1 is a perspective view showing all figures/views of the single to dual strap embodiment of this invention for eyewear.

Detailed description set forth below in connection with the drawing is intended as a description of the preferred embodiment of this invention; it is not intended to represent the only form in which the present invention may be constructed or utilized. It is understood, however, that the same or equivalent functions may be accomplished by slightly different embodiments, utilizing different materials, which can accomplish within the spirit and scope of the invention, the same outcome, i.e. securing two separate sets of eyewear on the same strap.

FIG. 1 illustrates the overall arrangement of the preferred embodiment, which holds two separate pairs of eyewear with a single strap around ones neck. Many types of straps could be utilized with various end connectors, such as, but not limited to, metal, cloth, beading, rubber, plastic, jewel, leather, etc.

Figure 2:
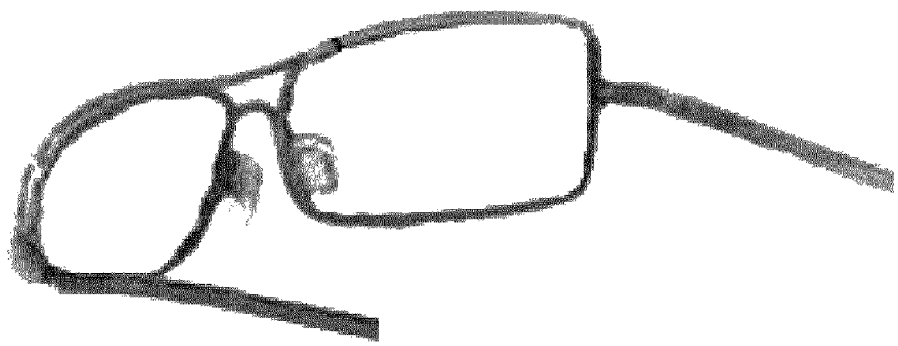
FIG. 2 is a view of reading eyewear.

FIG. 2 provides a view of the eyewear, which can be of many different types, such as, but not limited to, safety, sunglasses, sport glasses, prescription glasses, reading glasses or any combination of the above.

Figure 3:
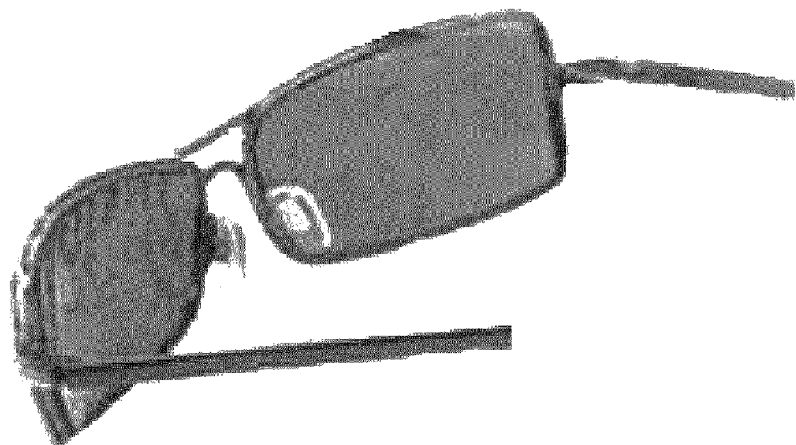
FIG. 3 is a view of sun blocking eyewear.

FIG. 3 provides a view of the second pair of eyewear, which can also be of many different types, such as, but not limited to, safety, sun-glasses, sport glasses, prescription glasses, reading glasses or any combination of the above.

Figure 4:
FIG. 4 is a view of the connector for the sun blocking eyewear.

FIG. 4 provides a view of the connectors, which holds eyewear to double strap ends. This connector can be made of a rubberized material, which fastens into the earpiece of each set of eyewear; the earpiece simply slides into the connectors.

Figure 5:
FIG. 5 is a view of the connector for the reading eyewear.

FIG. 5 provides a view of the other connectors, which also holds eyewear to double strap ends. This connector can be made of a rubberized material, which fastens into the earpiece of each set of eyewear; the earpiece simply slides into the connectors.

Figure 6:
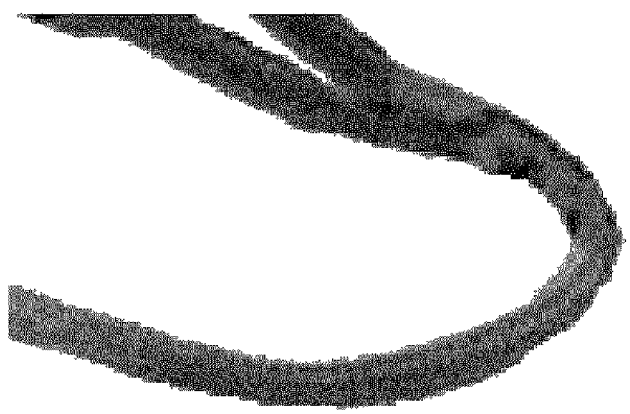
FIG. 6 is a view of the single strap, which splits into two straps for the connectors in FIG. 4.

FIG. 6 provides a view of the single strap, which comes from the adjustment block and splits into double strap ends, which then leads to the connector ends to hold the eyewear.

Figure 7:
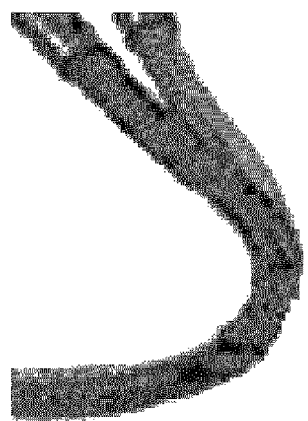
FIG. 7 is a view of the single strap, which splits into two straps for the connectors in FIG. 5.

FIG. 7 provides a view of the other single strap, which comes from the adjustment block and splits into double strap ends, which then leads to the connector ends to hold the eyewear.

Figure 8:
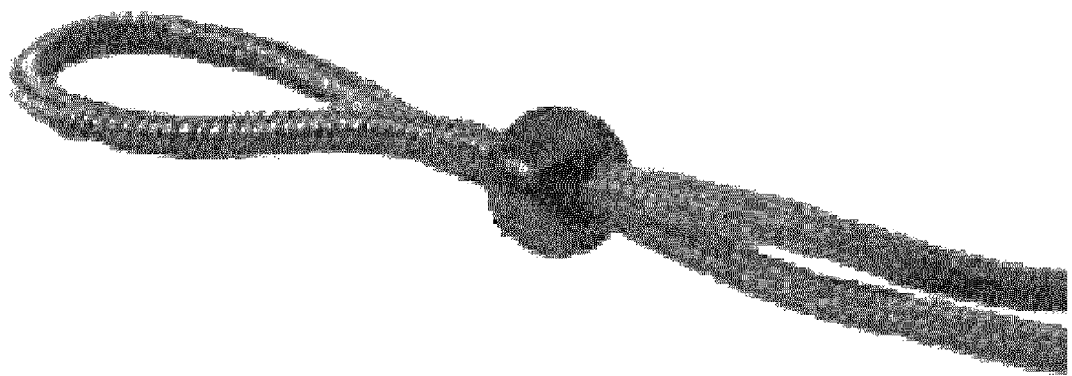
FIG. 8 is a view of the adjustment block on the single strap to adjust positioning around one's neck.

FIG. 8 provides a view of the single strap, which goes through the adjustment block, is then adjustable and secured around one's neck.

The invention claimed is:

1. A dual eyewear strap around the neck of a user for holding two pairs of eyeglasses having temples, comprising:
    a single foldable strap having a first end portion and a second end portion, each of said first and second end portions splits into double strap ends, the first double strap ends coupled to the temples of the first pair of eyeglasses, the second double strap ends coupled to the temples of the second pair of eyeglasses; and
    an adjustment slider is capable of sliding on the folded single strap for adjusting the strap length between said two pairs of eyeglasses.

2. The dual eyewear strap as claimed in claim 1, wherein said pair of eyeglasses is selected from a group of safety glasses, sunglasses, sport glasses, prescription glasses and reading glasses.

3. The dual eyewear strap as claimed in claim 1, wherein said strap has a length of approximately 12 inches, each of said first and second double ends has a length of approximately 4 inches.

* * * * *